United States Patent [19]

Weihe

[11] Patent Number: 5,680,907

[45] Date of Patent: Oct. 28, 1997

[54] AUXILIARY SOLAR-POWER AUTOMOBILE DRIVE SYSTEM

[76] Inventor: Clyde R. Weihe, 17 Lindbergh Ave., Needham Heights, Mass. 02194

[21] Appl. No.: 390,637

[22] Filed: Feb. 17, 1995

[51] Int. Cl.$^6$ ............................................. B60L 9/00
[52] U.S. Cl. ...................... 180/2.2; 180/15; 180/209; 180/65.3
[58] Field of Search .............. 180/2.2, 2.1, 198, 180/202, 15, 16, 209, 65.1, 65.2, 65.3; 280/767, 47, 43.17, 43.23

[56] References Cited

U.S. PATENT DOCUMENTS

| | | | |
|---|---|---|---|
| 3,196,969 | 7/1965 | Senzani | 180/202 |
| 3,502,165 | 3/1970 | Matsukata | 180/65.2 |
| 4,314,160 | 2/1982 | Boodman et al. | 180/2.2 |
| 4,470,476 | 9/1984 | Hunt | 180/65.2 |
| 4,592,436 | 6/1986 | Tomei | 180/65.3 |
| 4,602,694 | 7/1986 | Weldin | 180/2.2 |
| 5,492,189 | 2/1996 | Kriegler et al. | 180/65.2 |

FOREIGN PATENT DOCUMENTS

| | | | |
|---|---|---|---|
| 0492152 | 7/1992 | European Pat. Off. | 180/65.3 |
| 2310238 | 12/1976 | France | 180/65.2 |
| 4000617 | 7/1991 | Germany | 180/65.2 |
| 4118678 | 12/1992 | Germany | 180/65.3 |

*Primary Examiner*—Anne Marie Boehler
*Attorney, Agent, or Firm*—Wolf, Greenfield & Sacks, P.C.

[57] ABSTRACT

In an automobile having a primary engine fueled by a primary source of fossil fuel energy, the primary engine and an auxiliary motor device are drivably connected to one or more ground engagement wheels of the automobile. A solar energy collecting device is mounted on the automobile for exposure to solar energy, and has an energy supply mechanism that routes energy collected by the solar energy collecting device to the auxiliary motor device. A control mechanism operates so that either energy is routed from the energy supply device to the auxiliary motor device, or energy is prevented from being routed to the auxiliary motor device.

11 Claims, 5 Drawing Sheets

AUXILIARY SOLAR-POWER AUTOMOBILE DRIVE SYSTEM

BACKGROUND

The present invention relates to auxiliary power devices for automobiles and more particularly to an auxiliary solar energy power source for driving one or more wheels of an automobile. Automobiles powered solely by solar energy are well-known and automobiles whose drive systems are powered solely by fossil fuel sources are well known. Combining the two sources of energy to drive an automobile has heretofore been deemed impractical due to limitations in design complexity and cost of manufacture.

SUMMARY OF THE INVENTION

In accordance with the invention, therefore, there is provided an automobile comprising a primary engine fueled by a primary source of fossil fuel energy, the primary engine being drivably connected to one or more of a plurality of ground engagement wheels mounted on the automobile; an auxiliary motor device drivably connected to one or more of the ground engagement wheels; a solar energy collecting device mounted on the automobile for exposure to solar energy; the solar energy collecting device including an energy supply mechanism routing energy collected by the solar energy collecting device to the auxiliary motor device; a control mechanism connected to the energy supply mechanism, the control mechanism being controllably operable between first and second positions wherein energy is routed from the energy supply device to the auxiliary motor device when the control mechanism is in the first position and wherein energy is prevented from being routed to the auxiliary motor device when the control mechanism is in the second position.

The energy supply device comprises a photovoltaic material and an electrically conductive cable connected to the solar energy collecting device and delivering energy to the auxiliary motor device.

The energy supply device may further comprise a battery connected between the solar energy collecting device and the auxiliary motor device, the battery storing energy collected by the solar energy collecting device and delivering stored energy to the auxiliary motor device.

The primary engine and the auxiliary motor device may alternatively be drivably connected to a common ground engagement wheel. The wheel which is drivably connected to the auxiliary motor device may be rotatably mounted on an arm which is controllably movable between a ground engagement and a ground disengagement position, the arm being pivoted into the ground engagement position when the control mechanism is in the first position.

The auxiliary motor device typically includes an energy regenerator connected to the battery, the energy regenerator being drivably connected to the wheel which is drivably connected to the auxiliary motor and operating to regenerate energy for storage in the battery in response to rotation of the drivably connected wheel when the control mechanism is in the second position.

DETAILED DESCRIPTION

Figure 1:
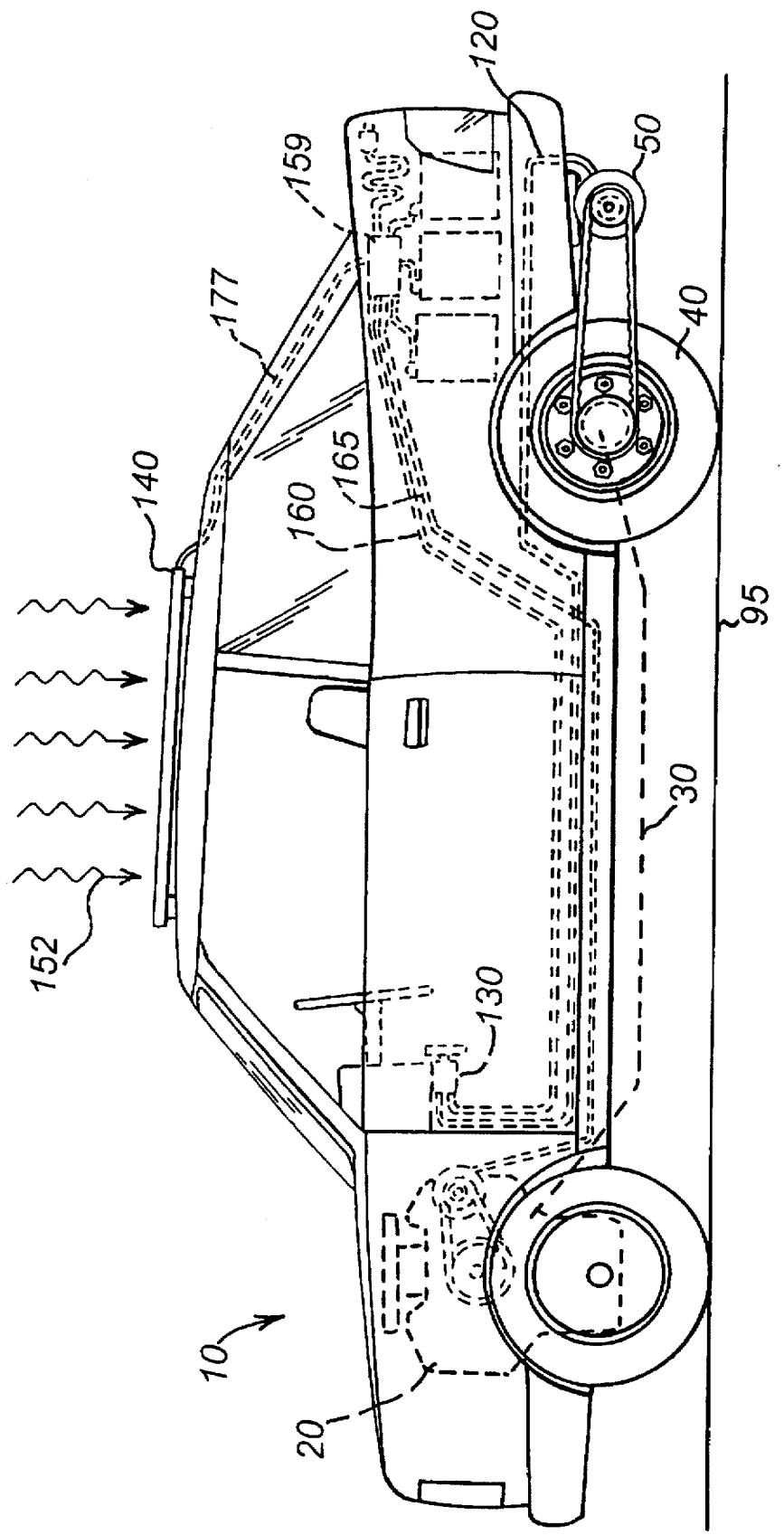
FIG. 1 is a side schematic view of an automobile showing an exemplary positioning of components of a solar energy powered apparatus according to the invention.

FIG. 1 shows an automobile 10 having a conventional gasoline or other fossil fuel powered engine 20 which is connected via a transmission 30 to the axle of the rear wheels 40 of the automobile 10. The engine 20 is capable of generating between about 50 and 500 horsepower. The engine 20 may be drivably interconnected to any one or more of the four wheels 40, 60 of the automobile 10 as is conventionally known.

Figure 2:
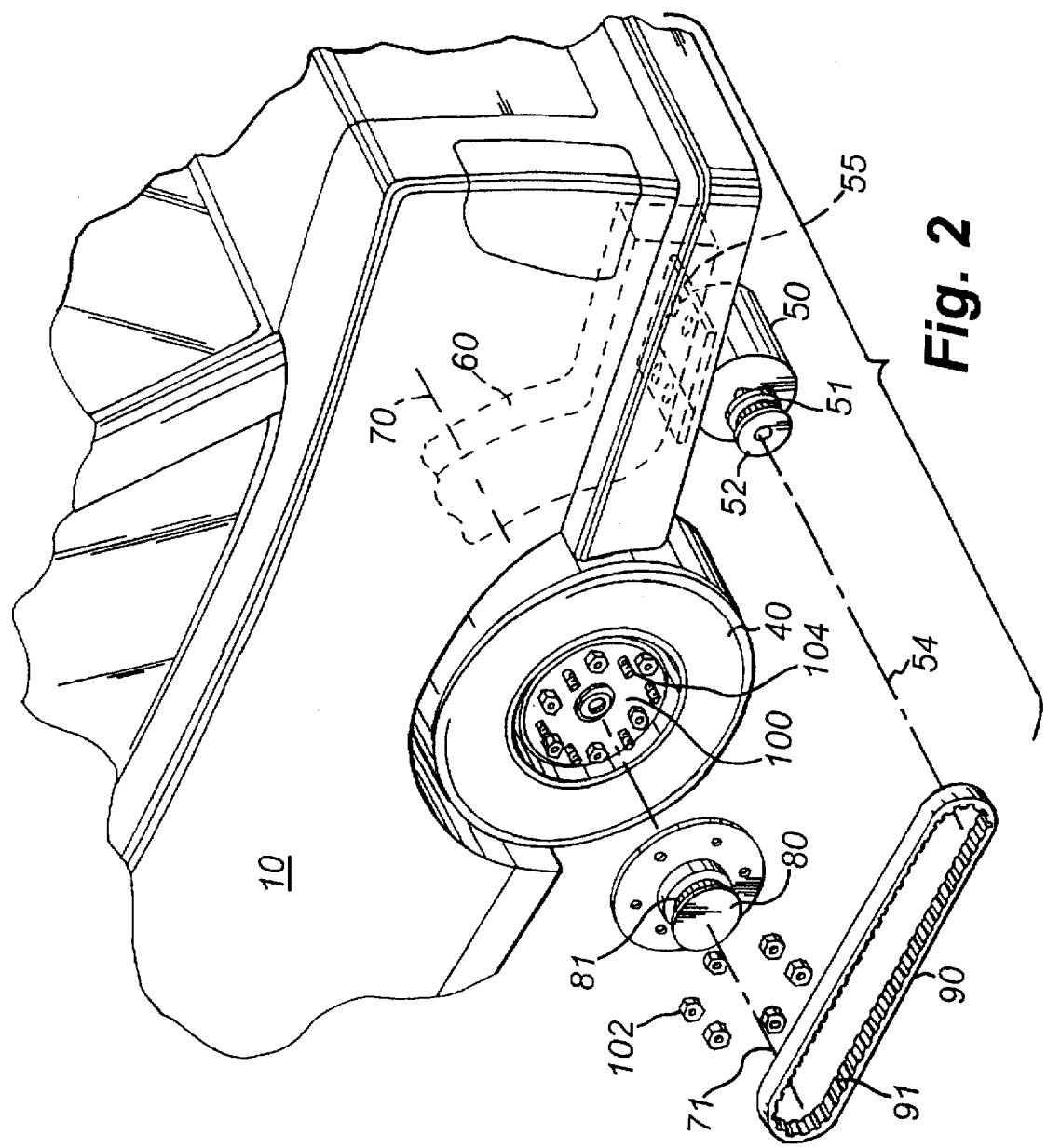
FIG. 2 is a perspective exploded view of the drivable connection between an auxiliary solar powered motor and one of the driven rear wheels of the FIG. 1 automobile.

A motor 50 having lesser horsepower than the primary engine 20, typically less than about 100 hp, and preferably from about 1 to about 50 hp, is mounted on a mounting arm 60, FIG. 2, which is in turn interconnected to the frame of the automobile. The arm 60 may be interconnected to the axle 20 of wheel 40 such that the motor 50 and axle 70 move in unison with each other in response to vibration and shock induced movement of wheel 40 and axle 70.

Figure 4:
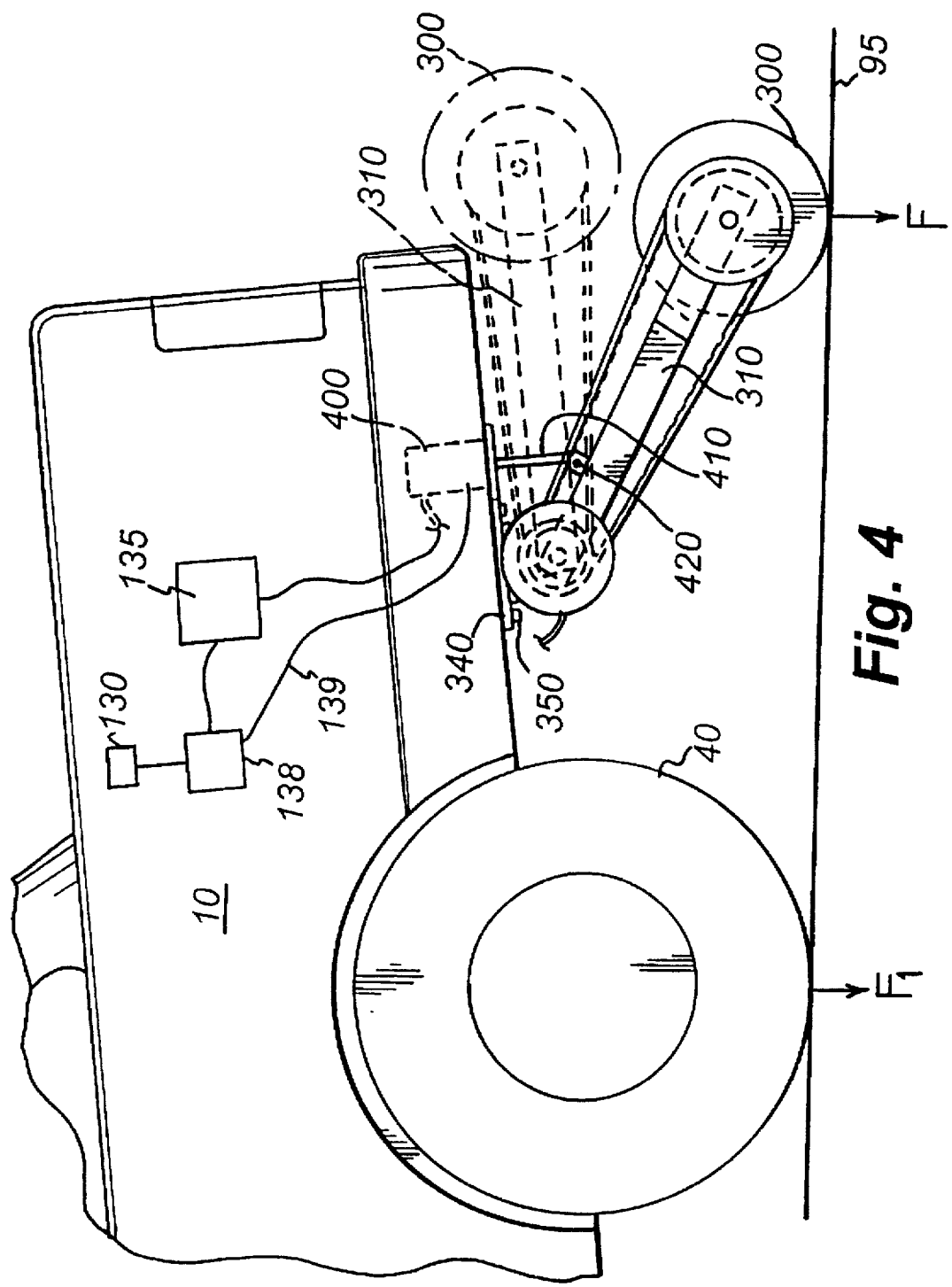
FIG. 4 is a side view of the rear portion of an automobile showing an auxiliary driven wheel in an upper nondrive and lower drive position.
Figure 5:
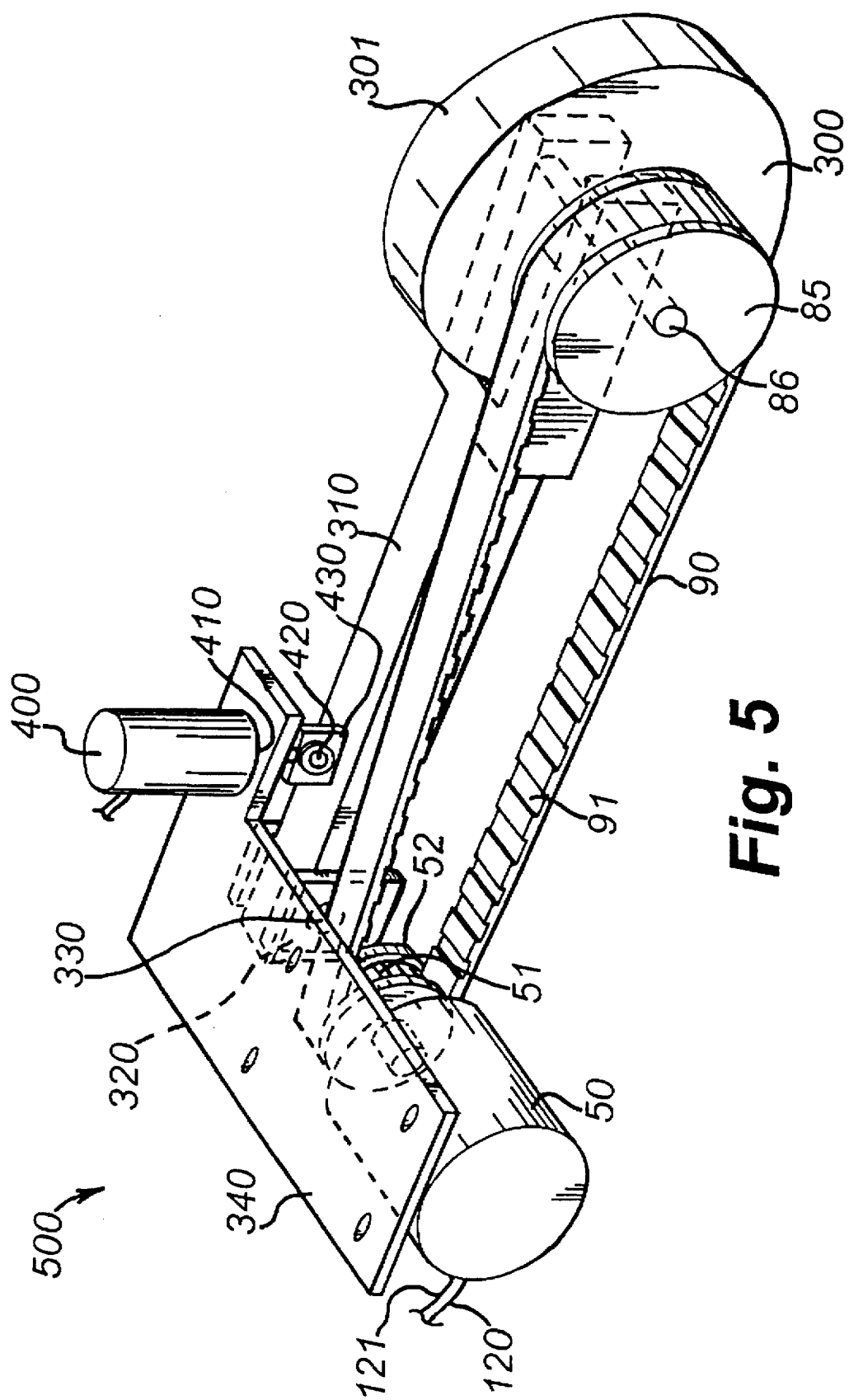
FIG. 5 is a perspective view of the auxiliary wheel component shown in FIG. 4 showing certain details of the drive connection and mounting of the auxiliary solar power driven wheel.

As shown in FIGS. 2, 4, and 5 the motor 50 is drivably interconnected via a drive belt 90 to a wheel hub 80 which is interconnected to the axle 70 for coincident rotation around the axis 71 of the axle 70. As can be readily imagined the endless drive belt 90 is provided with suitable teeth 91 which mesh with complementary gear teeth 51 and 81 provided on motor drive hub 52 and wheel hub 80 respectively. The drive belt 90 is wrapped tacitly around and between hubs 52, 80 and preferably comprises a flexibly resilient or elastic material which can stretch beyond is initial tacitly wrapped around position shown in FIG. 2 such that any separation in distance between the axes 71 and 54 of the hubs when the wheel 40 may be subjected to vibration or shock when the automobile is moving over the ground 95, FIG. 5, does not result in a disengagement of teeth 91 from the teeth 51 or 81 and further does not result in belt 90 breaking due to elongation beyond about 40% of its initial state length when the automobile is not moving. Preferably, the length of the stretchable belt 90 is selected such that the belt 90 must be slightly stretched to fit around hubs 52, 80 under a slight tension of between about 1 and about 15 pounds when the automobile is in an initial nonmoving position as shown in FIGS. 1 and 2.

As shown, the hub 80 is attached to rotatably mounted hub 100 of wheel 40 via nuts 102 which attach to complementary bolts 104. Also as shown, motor 50 is attached to mounting plate 55 which is in turn attached to arm 60. Where arm 60 is preferably interconnected to axle 70 such that arm 60 moves in unison with axle 70, stretching of belt 90 which might occur due to vibration or shock imparted to wheel is thus minimized.

Figure 3:
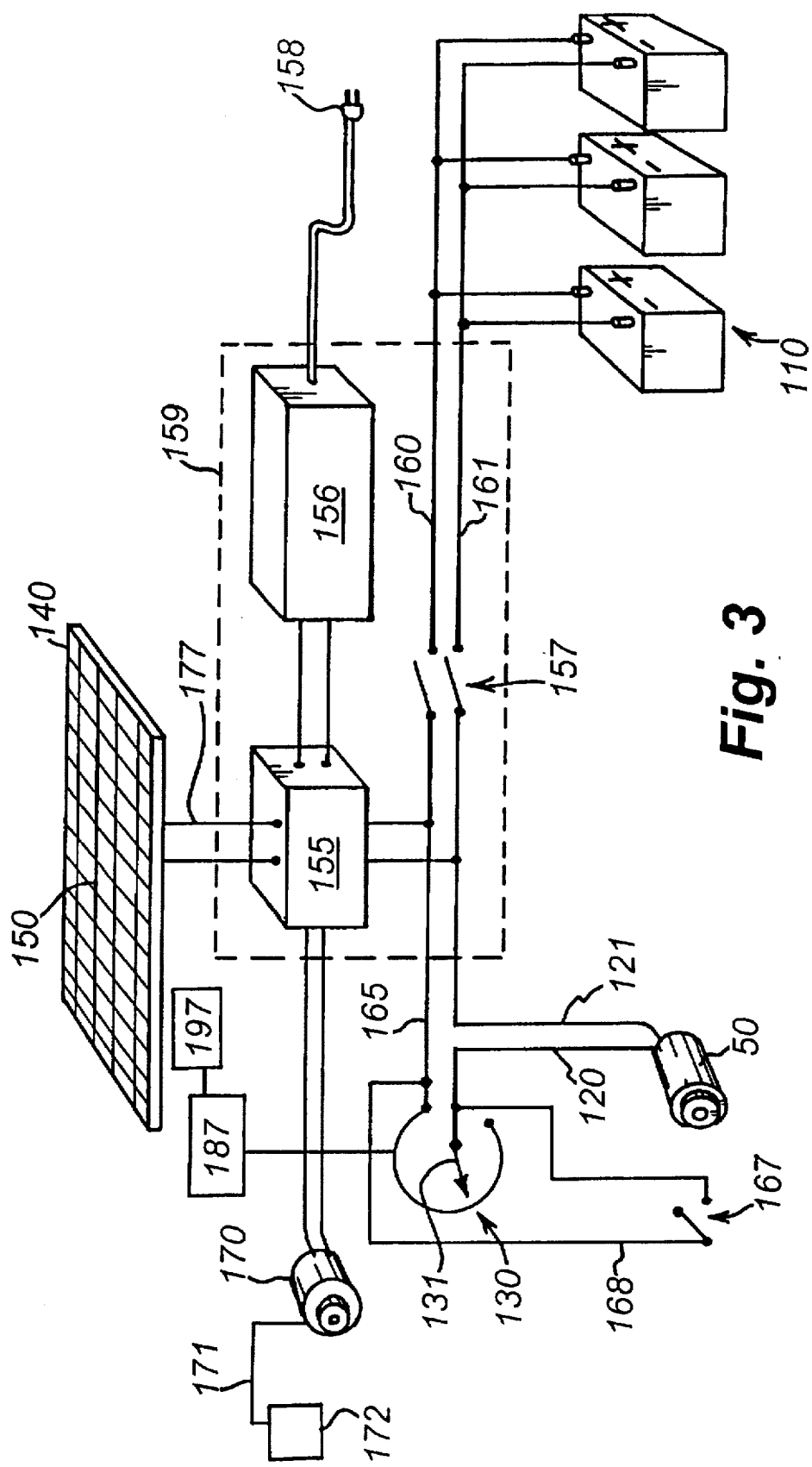
FIG. 3 is a schematic of electrical connections among a solar energy panel and a rheostat, motor, batteries and other components of a system according to the invention.

As shown in FIGS. 1 and 3, motor 50 is an electrically powered motor 50 which is interconnected to a battery supply 110 via lines 120 and 121 and a rheostat 130. The batteries 110 are interconnected to solar panels 140 which are mounted on the automobile such that a solar energy collecting and converting material 150 is exposed to ambient solar energy rays 152, FIGS. 1 and 3. The material 150 when exposed to rays 152 automatically converts the energy of rays 152 to electrical energy which is conducted to batteries 110 via lines 160 and 161 and stored therein. Material 150 includes conventional photoelectrically sensitive material having a mechanism such as diodes which converts solar energy to electrical energy.

As shown in FIG. 3, the solar panels may be connected first to voltage regulator 155 which in turn may be connected to the rheostat 130 which controls the delivery of electrical energy to the motor 50. The rheostat 130, depending on the position of the variable resistor control will deliver a selected amount of current to the motor 50 and thus the speed of the motor 50 is controlled. As shown the voltage regulator 155 is preferably also connected via lines 160, 161 to the batteries 110 through a switch 157. When the switch 157 is open as shown, solar energy collected by the panels 140 is routed directly via line 165 to the rheostat 130 which in turn can be manually controlled to deliver a selected amount of energy to the motor such that the speed of motor 50 can be selected as desired by the user. When the switch 157 is closed, solar energy collected by the panels is routed to both the rheostat and the batteries which in turn simultaneously deliver stored electrical energy to the rheostat 130 for powering the motor 50. Thus, when the switch 157 is open the solar panels may power the operation of motor 50 through the rheostat even without stored energy from the batteries 110. Inclusion of the batteries 110 is preferred to ensure that the motor 50 can be operated at all desired times even when sufficient ambient solar energy is not available at any given time to supply energy to motor 50. Preferably, switch 157 remains closed at all times. However, as mentioned, motor 50 may be supplied with energy directly from the diode conversion capability of panel material 50 without energy from batteries 110 when ambient solar energy is available.

Motor 50 preferably includes a recharging generator which is connected via line 121 through switch 157 to batteries 110 for recharging batteries 110 when the rheostat 130 is in an off or closed position. As shown a diversion switch 167 and circuit 168 may be provided such that when the rheostat 130 is turned off and the motor 50 is functioning to recharge, electrical recharge energy is not dissipated by the rheostat 130.

The generator included in the motor 50 functions by rotation of wheel 40 and hub 80 when the wheel 40 is being driven by engine 20 through transmission 30. The motor 50 includes a circuit mechanism which automatically disables the regenerating function of the motor 50 when the rheostat is on supplying energy to the motor 50. The rheostat 30 includes a switch which automatically closes the diversion circuit switch 167 when the rheostat 130 is in the off position such that the generator function of the motor 50 is enabled and regenerated energy is diverted around the rheostat.

As shown in FIGS. 1, 3 the voltage regulator may also be connected to the normal primary alternator 170 of the automobile. The alternator 170 via connection 171 and lines 160, 161 may thus simultaneously recharge the primary engine battery 172 and batteries 110.

Control element 130 may alternatively comprise a pulse width modulator used in combination with a commutating motor 50. If motor 50 is an AC motor and an AC to DC convertor is included in the circuit between control element 130 and panels 140, control element 130 may also alternatively comprise a conventional AC current control system which can control the power being delivered and thus the speed of motor 50. Even further motor 50 may comprise a variable inductance motor and control element 130 may simply comprise a central dial which is controllable to select the amount of inductance in the motor.

The solar energy powered motor may alternatively be drivably connected to a wheel 300 which is independent of the primary drive system of the automobile. For example as shown in FIGS. 4,5 a wheel 300 may be mounted on the end of a pivoting arm 310 which is pivotally mounted on another end to a bracket 320 via a pin 330. The bracket 320 is attached to the underside of a mounting plate 340 which is readily attachable via conventional means such as bolts 350 to the rear underside portion of the frame or other structural member (such as a beam, not shown, interconnected to the frame) of the vehicle 10.

As shown in FIGS. 4, 5 the auxiliary motor 50 is attached to the underside of mounting plate 34 such that belt 90 may be conveniently wrapped under tension around motor hub 52 and wheel hub 85. Hub 85 is attached to axle 86 and includes drive teeth similar to teeth 81, FIG. 2, such that wheel 300 is driven by motor 50 via belt 90, FIG. 5. As shown in FIG. 5 axle 86 is rotatably mounted in a complementary transverse aperture provided in the distal end of arm 310.

A conventional hydraulic or pneumatic cylinder 400 is mounted on the upperside of plate 340 as shown in FIGS. 4, 5. A piston 410 sealably mounted within cylinder 400 extends through plate 340 and is controllably drivable back and forth (up and down, as shown) within cylinder 40. The end of piston 410 is pivotably attached to a pin 420 which is stationarily mounted on a bracket 430 which is in turn attached to arm 310. As shown in FIG. 4 the piston 410 is in a retracted position whereby the arm 310 and wheel 300 are held in the upwardly pivoted, dashed line position shown in FIG. 4. The piston 410 is automatically driven to its retracted position by a pump 135 when rheostat 130 is in its off (i.e. no current delivery) position. Pump 135 is connected to a pump control 138 which is in turn interconnected to rheostat 130. When the rheostat 130 is turned to an on position whereby energy is being supplied to motor 50, control 138 automatically responds to the supply of energy to motor 50 and signals pump 135 to operate to supply pneumatic or hydraulic pressure to cylinder 400 thus extending piston 410 from its retracted position and thus pivoting arm 310 into the solid line position shown in FIG. 4. As shown in FIGS. 4,5 when the arm 310 is pivoted to the solid line position shown in FIG. 4, the circumferential surface 301 of wheel 300 engages the ground 95.

Preferably, the control 138 is connected 139 to cylinder 400 and includes a mechanism for sensing and controlling the amount of pressure in cylinder 400 such that a preselected degree of friction force F is maintained between the surface 301 of wheel 300 and the ground 95 when the arm 310 is pivoted to its operating ground engagement (solid line) position, FIG. 4 Preferably, the pressure force F is maintained at about the same pressure force $F_1$, as exists between an engine 20 driven wheel 40 and the ground 95, FIG. 4.

As shown in FIG. 1, the electrical assembly may also include an AC to DC converter 156 for supplying electrical energy to a utility outlet 158 for use in the vehicle 10.

The rheostat switch may also be connected to a drive control 187 which is interconnected to an engine control circuit or transmission control device 197. The primary drive control 187 includes a mechanism which is responsive to the on or off position of the rheostat 130 and operates to automatically signal the engine circuit or transmission control 197 that the rheostat is in either an on (energy supply)

or an off (no energy supply) position. The engine circuit or transmission control 197 operates to suppress, i.e. either slow down, stop deactivate or disengage, the engine circuit or transmission when the primary drive control 187 is signalling the control 197 that the rheostat 130 is in an on (energy supply) position. Such a system is particularly useful in an application where the auxiliary motor 50 is intended for use in driving the car 10 in stop-and-start slow moving traffic such that operation of the primary fossil fuel powered engine 20 is substantially slowed down or deactivated altogether when the rheostat 130 is actuated thus automatically minimizing the use of fossil fuel in stop-and-start traffic where high powered engine 20 drive is not necessary to drive the car 10.

The apparatus shown in FIG. 5 is preferably constructed as an independent subassembly 500 which can be readily attached to a conventional commercial automobile as shown in FIG. 4 and interconnected or wired to the circuitry and components shown in FIG. 3 relatively easily.

I claim:

1. An automobile comprising:

a primary engine fueled by a primary source of fossil fuel energy, the primary engine being drivably connected to one or more of a plurality of ground engagement wheels mounted on the automobile;

an auxiliary motor device drivably connected to and in coincident rotation with one or more of the ground engagement wheels; the primary engine, and the auxiliary motor device each being separately drivably connected to a different ground engagement wheel;

a solar energy collecting device mounted on the automobile for exposure to solar energy;

the solar energy collecting device including an energy supply mechanism routing energy collected by a solar energy collecting device to the auxiliary motor device, said energy supply mechanism comprising at least one battery connected to the auxiliary motor device, the battery storing energy collected by the solar energy collecting device and delivering stored energy to the auxiliary motor device;

a control mechanism connected to the energy supply mechanism, the control mechanism being selectively operable between first and second positions wherein energy is selectively routed from the energy supply mechanism to the auxiliary motor device when the control mechanism is in the first position and wherein energy is prevented from being routed to the auxiliary motor device when the control mechanism is in the second position;

an energy regenerator connected to the at least one battery, the energy regenerator being drivably connected to one of said ground engagement wheels driven by the auxiliary motor device, wherein said energy regenerator operates to regenerate energy for storage in the at least one battery in response to rotation of the drivably connected ground engagement wheel when the control mechanism is in the second position.

2. The automobile of claim 1 wherein the energy supply mechanism comprises a photovoltaic material and an electrically conductive cable connected to and delivering energy to the auxiliary motor device.

3. The automobile of claim 1 wherein the primary engine and the auxiliary motor device are drivably connected to a common ground engagement wheel.

4. The automobile of claim 1 wherein the wheel which is drivably connected to the auxiliary motor device is rotatably mounted on an arm which is drivably movable between a ground engagement and a ground disengagement position, the arm being pivoted into the ground engagement position when the control mechanism is in the first position.

5. An automobile having a plurality of ground engagement wheels, one or more of said wheels being drivably connected to a primary engine fueled by a primary source of energy, the improvement comprising:

a solar energy collecting device mounted on the automobile for exposure to solar energy, an auxiliary motor device drivably connected to and in coincident rotation with one or more of the ground engagement wheels, the solar energy collecting device including an energy supply mechanism connected to the auxiliary motor device, the energy supply mechanism routing energy collected by the solar energy device to the auxiliary motor device, said energy supply mechanism comprising at least one battery connected to the auxiliary motor device, the battery storing energy collected by the solar energy collecting device and delivering stored energy to the auxiliary motor device;

a control mechanism connected to the energy supply mechanism, the control mechanism being selectively operable between first and second positions wherein energy is selectively routed from the energy supply mechanism to the auxiliary motor device when the control mechanism is in the first position and wherein energy is prevented from being routed to the auxiliary motor device when the control mechanism is in the second position;

an energy regenerator connected to the at least one battery, the energy regenerator being drivably connected to one or more of the ground engagement wheels driven by the auxiliary motor device, wherein said energy regenerator operates to regenerate energy for storage in the at least one battery in response to the rotation of the drivably connected ground engagement wheel when the control mechanism is in the second position; and the ground engagement wheel to which the auxiliary motor device is drivably connected is mounted on the automobile for controlled movement between a position in engagement with the ground and a position not in engagement with the ground.

6. The improvement of claim 5 wherein the automobile includes a transmission system drivably connecting the engine to one or more of the wheels, the engine driving the transmission and the transmission driving the one or more wheels, the improvement further comprising an interrupt mechanism connected to the control mechanism, the interrupt mechanism suppressing operation of at least one of the engine and the transmission when the control mechanism is in the first position.

7. The improvement of claim 6 wherein the interrupt mechanism is connected to at least one of an engine control circuit and an engine fuel delivery device, the interrupt mechanism suppressing operation of at least one of the engine control circuit and the engine fuel delivery device when the control mechanism is in the first position such that operation of the engine is suppressed.

8. The improvement of claim 5 wherein the energy supply device comprises an electrically conductive cable connected to the solar energy collecting device delivering energy to the auxiliary motor device without intermediate storage of the energy.

9. The improvement of claim 8 wherein the energy supply device comprises a battery connected between the solar energy collecting device and the auxiliary motor device, the battery storing energy collected from the solar energy collecting device and delivering stored energy to the auxiliary motor device.

10. The improvement of claim 5 wherein the primary engine and the auxiliary motor device are drivably connected to a common ground engagement wheel.

11. The improvement of claim 5 wherein the wheel which is drivably connected to the auxiliary motor device is rotatably mounted on an arm which is drivably movable between the ground engagement and disengagement position, the arm being driven into the ground engagement position when the control mechanism is in the first position.

* * * * *